Oct. 10, 1961  V. MANDORF, JR  3,003,885
TITANIUM DIBORIDE ARTICLE
Filed Feb. 1, 1960  4 Sheets-Sheet 1

INVENTOR
VICTOR MANDORF, JR.
BY John F. Hohmann
ATTORNEY

INVENTOR.
VICTOR MANDORF, JR.

3,003,885
TITANIUM DIBORIDE ARTICLE
Victor Mandorf, Jr., Fostoria, Ohio, assignor to Union Carbide Corporation, a corporation of New York
Filed Feb. 1, 1960, Ser. No. 5,716
4 Claims. (Cl. 106—39)

This invention relates to a method of hot pressing titanium diboride ($TiB_2$) compositions using refractory nitrides as additions to enhance the resultant physical properties. More specifically, the invention relates to a titanium diboride-based article having a positive temperature-flexural strength coefficient.

One present application of hot pressed titanium diboride articles involves 2 inch diameter by 18 inch long rods, which are used as cathode lead-in rods in aluminum reduction cells. The rods should have a fairly uniform density along their lengths, and they should have an average density of 4.00 or above, if possible. To make these rods, titanium diboride is cold pressed using short plugs about 2 inches long. The proper number of cold pressed lugs is stacked one on top of the other in a graphite mold, and hot pressed together into a long rod.

One of the major difficulties in hot pressing titanium diboride shapes to a uniform density stems from the fact that the material exhibits an extreme lack of plasticity even at temperatures as high as 2000° C. Accordingly, still higher temperatures have been recommended to obtain suitably high densities in the finished shapes, together with the use of a starting material having a very fine particle size. With these expedients extreme crystal growth often takes place within the structure of the pressed shape so that the shape becomes embrittled and seriously weakened by internal crystal strain.

By the instant invention this difficulty is overcome, and hot pressed titanium diboride shapes are produced having new and enhanced properties, not attainable by prior art processes.

The main object of this invention is to provide a method for producing hot pressed articles having greatly improved uniformity of strength at densities of 95 to 97 percent of theoretical.

A further object is the production of titanium diboride articles which show increasing strength with increasing temperature.

The present invention comprises mixing finely divided titanium diboride with from about 1 to about 5 percent by weight of a fugitive resinous binder having a low coking value and from about 3 to about 10 percent by weight of a nitride of an element selected from the group consisting of zirconium, boron, titanium, hafnium, vanadium, niobium, chromium, tantalum, molybdenum and tungsten, the amount of the nitride being sufficient to provide a final nitrogen content of at least 0.5 percent by weight of the finished hot pressed article; cold pressing the thus formed mixture under a pressure ranging from about 10 tons to about 20 tons per square inch, and finally hot pressing the thus formed shape at a temperature of about 2000 to about 2300° C., but preferably around 2200 to 2250° C. under a pressure of around one ton per square inch.

In hot pressing $TiB_2$, density is a function of the particle size distribution of the starting powder. For highest density the particle size distribution should be such that the maximum to minimum particle size be in a ratio of approximately 3 to 1.

Figure 3:
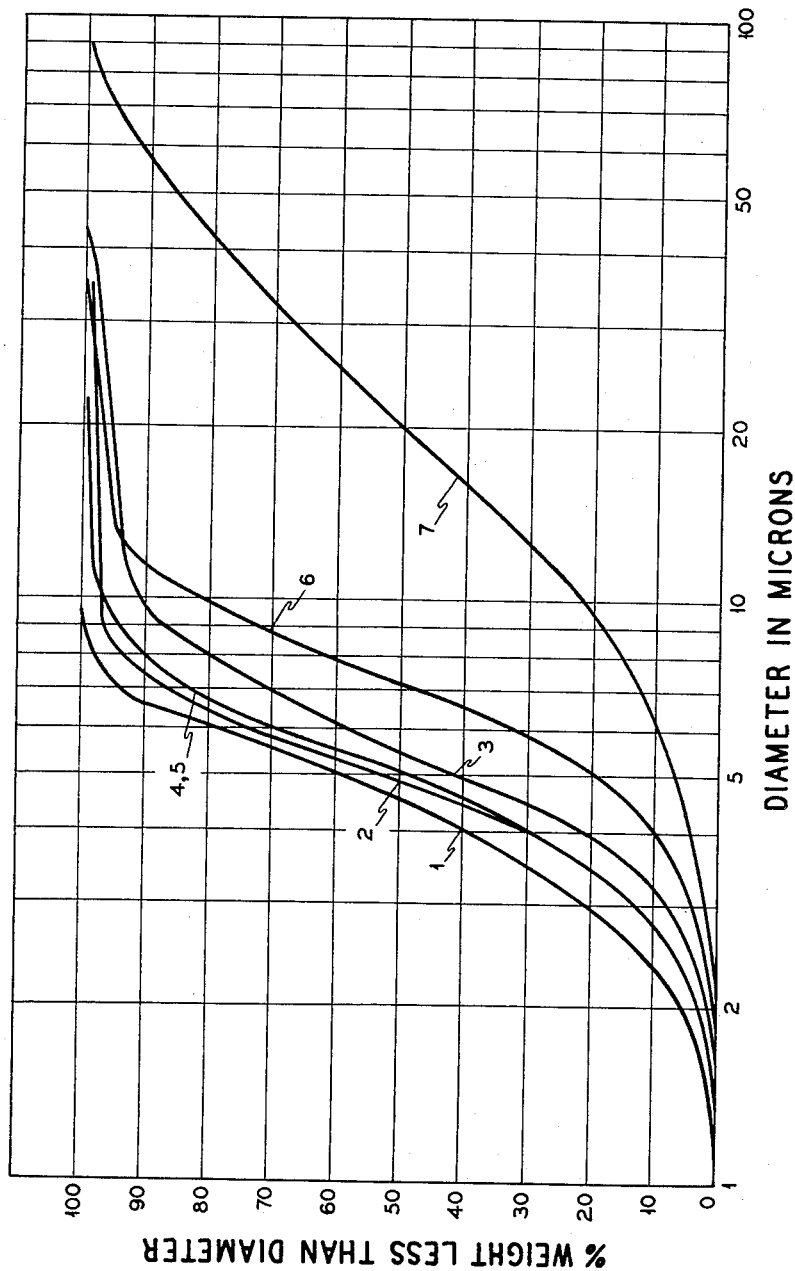
FIGS. 3 and 4 are curves showing the particle size distribution analysis used in determining what particle size of titanium diboride is suitable in the practice of the invention.
Figure 4:
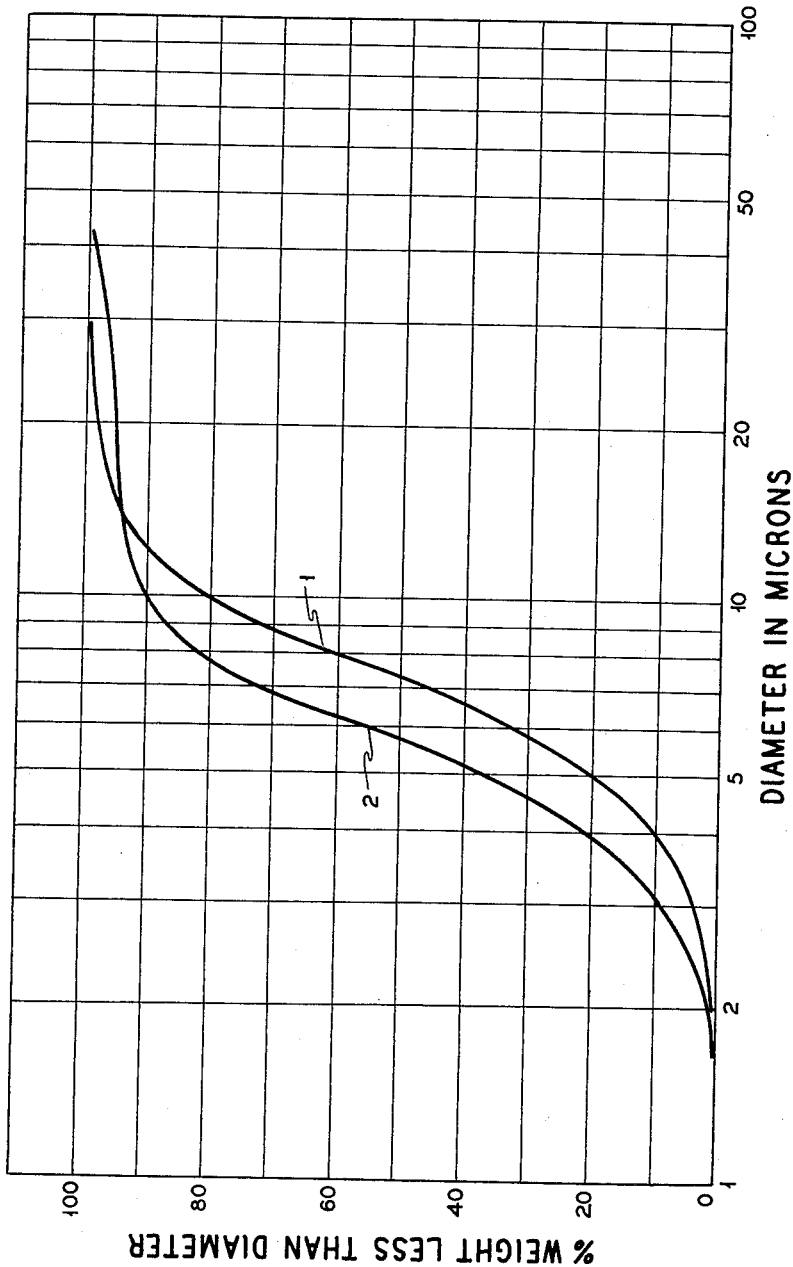

In attached FIGS. 3 and 4 are shown particle size distribution analysis curves which illustrate examples of eight lots of $TiB_2$, seven of which were found to be satisfactory for use in the practice of this invention, and one of which, lot 7, was not satisfactory. In this latter case the average particle size was too great, and the particle size distribution was not suitable. Data from the curves shown in FIGS. 3 and 4 are shown here:

TABLE I

Titanium diboride particle size distribution

| Lot No. | Aver. Particle Size (Microns) | Col. 1 Particle Size Range [1] | Col. A Non-logarithmic Micromerograph Slope [2] | Col. B Ratio of Max. to Min. Particle Size [1] |
|---|---|---|---|---|
| 40–46 | 7.4 | 4.0–12 | 10.0 | 3.0 |
| 59–2 | 5.8 | 3.0–10 | 11.4 | 3.3 |
| Run 1 | 4.6 | 2.3–6.6 | 18.5 | 2.9 |
| Run 2 | 4.9 | 2.8–7.5 | 17.0 | 2.7 |
| Run 3 | 5.5 | 3.2–9.7 | 12.3 | 3.0 |
| Run 4–5 | 5.1 | 2.3–8.2 | 13.6 | 3.6 |
| Run 6 | 7.2 | 4.0–11.5 | 10.7 | 2.9 |
| Run 7 | 20 | 6.2–57 | 1.6 | 9.2 |

[1] Excluding the 10 percent fraction representing the very finest particles and excluding the 10 percent fraction representing the coarsest particles.
[2] The slope is calculated by dividing 80 percent by the spread in particle size values shown in column 1.

Selection of $TiB_2$ of fineness suitable for the practice of this invention is determined by the slope of the Micromerograph curve, or by the ratio of the maximum to minimum particle size, and by the average particle size. It has been found that satisfactorily high hot pressed density is obtained when the slope values of the accumulative particle size distribution curve are in the range of from 10 to 20, or when the particle size ratio is between 2.7 and 3.6 for the 10 to 90 percent particle size. For instance, all of lots of $TiB_2$, except lot 7, shown in Table I produced a hot pressed density of between 4.35 and 4.46 whereas the density displayed by the articles produced with lot 7 showed a density of only 3.57.

For the attainment of other improved physical properties in the practice of this invention, such as high hot flexural strength, compressive strength and a lower thermal resistivity coefficient, it is essential there be present only a fine crystal structure in the hot pressed article. To obtain this condition it is essential that the initial average particle size of the $TiB_2$ used be maintained at about 6 microns. Average particle size should generally not exceed about 8 microns.

Fugitive binders suitable for the present method include those resinous substances having a coking value ranging from about 0.2 to 1 percent. Of these "Carbowax" 4000, a polyethylene oxide wax having a molecular weight of 4000, and rosin are preferred.

Figure 1:
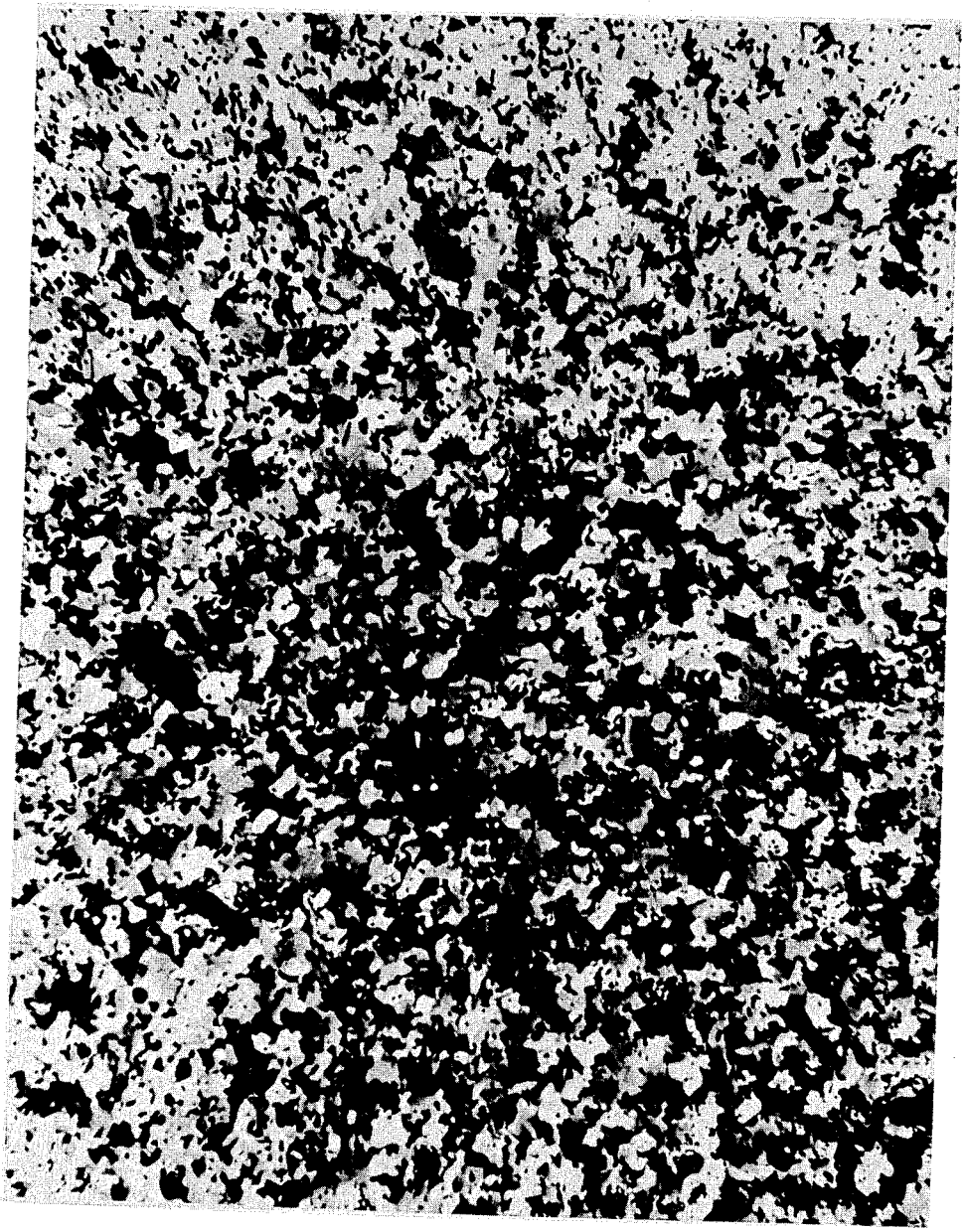
FIG. 1 is a photomicrograph under 200 power magnification of an article containing an additive in accordance with the invention.
Figure 2:
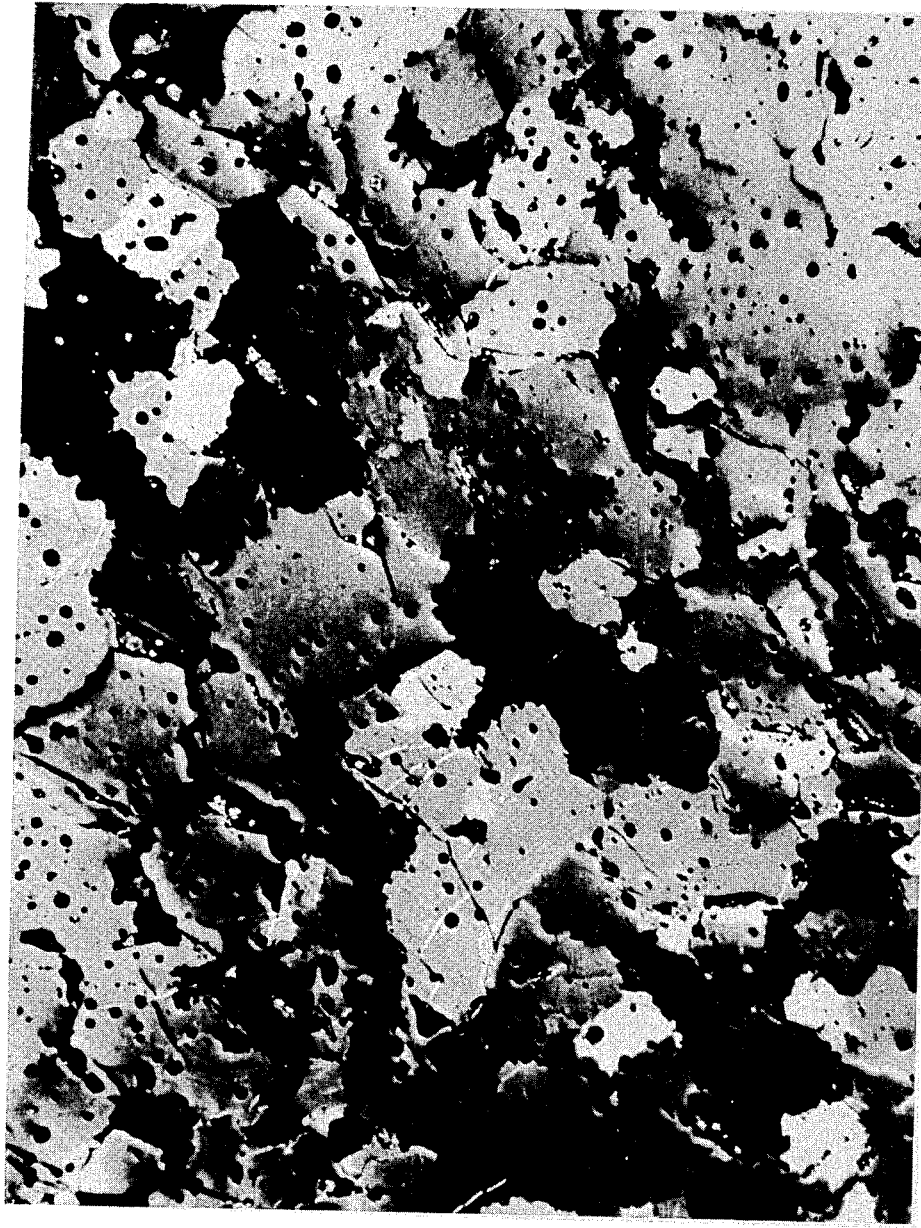
FIG. 2 is the same for an article prepared in the same manner, but without additive.

The effective results of the method of the invention are strikingly illustrated in the accompanying photomicrographs taken under polarized light. FIG. 1 shows the effect of adding 5 percent by weight of titanium nitride to a hot pressed titanium diboride article. FIG. 2 is a photomicrograph taken of an article containing 100 percent titanium diboride. Comparison of the two figures shows clearly that the addition of titanium has inhibited crystal growth. Further comparison of the light and dark areas representing crystal grains reveals this inhibition to be on the average of about ten-fold. That is to say that the nitride has reduced the size of crystals by a factor of about 10. Even the pinholes between and within crystals are smaller in the composition of FIG. 1.

Typical examples of the practice of this invention are had in the production of aluminum pot cathode lead-in rods. In one instance the rods were hot pressed from a $TiB_2$ composition containing a 5% increment of boron nitride and in another instance a 5% increment of titanium nitride was used; the procedure was as follows:

EXAMPLE 1

A mixture consisting of 95 parts of titanium diboride powder of a 7 micron particle fineness and 5 parts of boron nitride powder made by thermally reacting boric oxide with melamine was blended in a tumbling barrel together with 4 parts of Carbowax-4000 binder previously dispersed as a solution in acetone. After evaporation of the acetone the blend was screened to remove agglomerates and then cold pressed at approximately 12 t.s.i. in a steel mold into 2 inches diameter x 2½ inches long plugs. From the following apparent density values of the plugs and of plugs molded at this pressure without the boron nitride addition, it was evident that boron nitride acts as a molding lubricant.

TABLE II

| Plug Composition | | Molding Pressure, t.s.i. | Apparent Density |
|---|---|---|---|
| | Parts | | |
| Titanium Diboride | 95 | | |
| Boron Nitride | 5 | 12 | 2.71 |
| "Carbowax" | 4 | | |
| Titanium Diboride | 100 | | |
| Boron Nitride | 0 | 12 | 2.40 |
| "Carbowax" | 4 | | |

A number of plugs, sufficient to give a final rod length of about 18 inches, was stacked in a graphite mold, which was inserted into a graphite resistance type tube furnace. The mold was then heated in an argon atmosphere, at a rate of about 500° C./hr. to 2225° C. during which time the pressure on the mold plunger was gradually increased to 2000 p.s.i. This assembly was maintained at this pressure and temperature for about one and one-half hours, and then allowed to cool under pressure to about 500° C. The mold was then removed from the furnace.

EXAMPLE 2

A mixture similar to that given in Example 1, but containing titanium nitride instead of boron nitride, was also cold and hot pressed under conditions identical to those described under Example 1. In this instance, the cold-molded apparent density indicated no effect of the nitride as a molding lubricant, as was the case with the mixture containing boron nitride. Titanium nitride, however, still gave results which proved its suitability as a sintering aid.

In the following table are listed the composition, hot pressing conditions and physical properties measured on the finished rods.

TABLE III

*Composition and property of hot pressed rods*

| | | | |
|---|---|---|---|
| Composition, Wt. percent: | | | |
| $TiB_2$ (Ave. Particle Size 7.0μ) | 100 | 95 | 95 |
| BN | | 5 | |
| TiN | | | 5 |
| Hot Pressing Conditions: | | | |
| Temp., °C | 2,225 | 2,225 | 2,225 |
| Pressure, p.s.i. | 2,000 | 2,000 | 2,000 |
| Physical Characteristics: | | | |
| Length, in | 18 | 18 | 18 |
| Dia., in | 2 | 2 | 2 |
| Density, gms./cc | 4.31 | 4.21 | 4.37 |
| Percent of Theoretical | 95.4 | 95.7 | 95.7 |
| Resistivity, μohm cm.— | | | |
| 25° C | 13 | 17 | 12 |
| 200° C | 27 | 26 | 20 |
| 500° C | 51 | 41 | 33 |
| 1,000° C | 92 | 67 | 54 |
| Resistivity—Temp. Coef., μohm cm./° C | 0.080 | 0.051 | 0.042 |
| Flexural Strength, p.s.i.— | | | |
| 25° C | 32,000 | 34,500 | 43,400 |
| 1,000° C | 29,000 | 44,000 | 44,800 |
| 1,500° C | 16,000 | 50,000 | 60,000 |
| Compressive Str., p.s.i. at 25° C | $2.2 \times 10^5$ | $3.7 \times 10^5$ | $4.0 \times 10^5$ |
| Elastic Modulus, p.s.i. at 25° C | $47 \times 10^6$ | $52.7 \times 10^6$ | $62 \times 10^6$ |

It is interesting to note that densities of about 95 percent of theoretical are obtained independent of the presence of the nitride addition. In comparing the room temperature strengths of the three materials, it should be pointed out that rod made without the nitride addition displayed a wide variation in strength, ranging from 14,000 p.s.i. to 38,000 p.s.i. The rods made with a nitride showed a maximum variation of about 10%. A probable explanation of this improvement in uniformity rests on the difference in the degree of gain growth as shown in the accompanying photographs.

From a consideration of the high temperature resistivities and the hot strengths it is evident that the rods containing the nitride are distinctly superior to the rod made with only $TiB_2$. For instance energy losses in an aluminum cell operating at 1000° C. will be much less using the nitride containing rods. Similarly, the nitride containing rods, which have 50 percent greater strength at 1000° C., will be much more rugged in actual service.

It will be appreciated that refractory nitrides other than boron nitride and titanium nitride can be used advantageously in the practice of this invention provided such nitrides are stable. Aluminum nitride which has a high nitrogen vapor pressure at 2225° C. is not usable because the resultant metal aluminum enhances crystal growth. Nitrides in addition to titanium nitride and boron nitride which are suitable for the practice of this invention are nitrides of metals in groups IVA, VA and VIA of the periodic table such as Zr, Hf, V, Nb, Cr, Ta, Mo and W.

Since the additive forms but a minor part by weight of the total, its particle size is obviously not critical in the same sense as is that of the titanium diboride. However, the particle size of both should be of the same order of magnitude.

Actual experimentation with varying amounts of the nitride additive have shown that a final nitrogen (N) content in the hot pressed article of at least 0.5 percent is needed to prevent excessive crystal growth. The addition of more nitride than that required to produce more than 1½ percent N in the finished article does not result in further beneficiation of its properties.

What is claimed is:
1. A method of hot pressing finely divided titanium diboride comprising mixing titanium diboride having an average particle size of around 7 microns with a fugitive binder and with from about 3 to about 10 percent by weight of a refractory nitride of an element selected from the group consisting of zirconium, boron, titanium, hafnium, vanadium, niobium, chromium, tantalum, molybdenum and tungsten, cold pressing into shape the resulting mixture under a pressure ranging from about 10 to about 20 tons per square inch, and then hot pressing the formed shape at a temperature of about 2000 to 2300° C. under a pressure of about one ton per square inch.

2. The method of claim 1 wherein said hot pressing temperature ranges between about 2200 and 2250° C.

3. A hot pressed titanium diboride shape having a minimum density of 95 percent of theoretical and having a flexural strength in excess of 10,000 pounds per square inch, a positive temperature-flexural strength coefficient, and containing at least 90 percent by weight of titanium diboride, the balance being a refractory nitride of an element selected from the group consisting of zirconium, boron, titanium, hafnium, vanadium, niobium, chromium, tantalum, molybdenum and tungsten, the nitrogen content of said hot pressed shape being at least 0.5%.

4. A method of hot pressing shaped articles comprising forming a mixture consisting of a major amount by weight of titanium diboride and a minor amount by weight of a refractory nitride of an element selected from the group consisting of zirconium, boron, titanium, hafnium, vanadium, niobium, chromium, tantalum, molybdenum and tungsten, cold pressing into shape the resulting mixture under a pressure ranging from about 10 to about 20 tons per square inch, and then hot pressing the formed shape at a temperature of about 2000 to 2300° C.

References Cited in the file of this patent

UNITED STATES PATENTS 2,888,355     Taylor _____ May 26, 1959

UNITED STATES PATENT OFFICE
CERTIFICATION OF CORRECTION

Patent No. 3,003,885            October 10, 1961

Victor Mandorf, Jr.

It is hereby certified that error appears in the above numbered patent requiring correction and that the said Letters Patent should read as corrected below.

Column 3, line 13, after "titanium" insert -- nitride --.

Signed and sealed this 10th day of April 1962.

(SEAL)
Attest:

ERNEST W. SWIDER            DAVID L. LADD

Attesting Officer            Commissioner of Patents